Oct. 31, 1950
N. E. STARKEY
2,528,252
RATE OF CHANGE AND MAXIMUM LIMIT
DEVICE FOR REGULATING SYSTEMS
Filed May 6, 1948
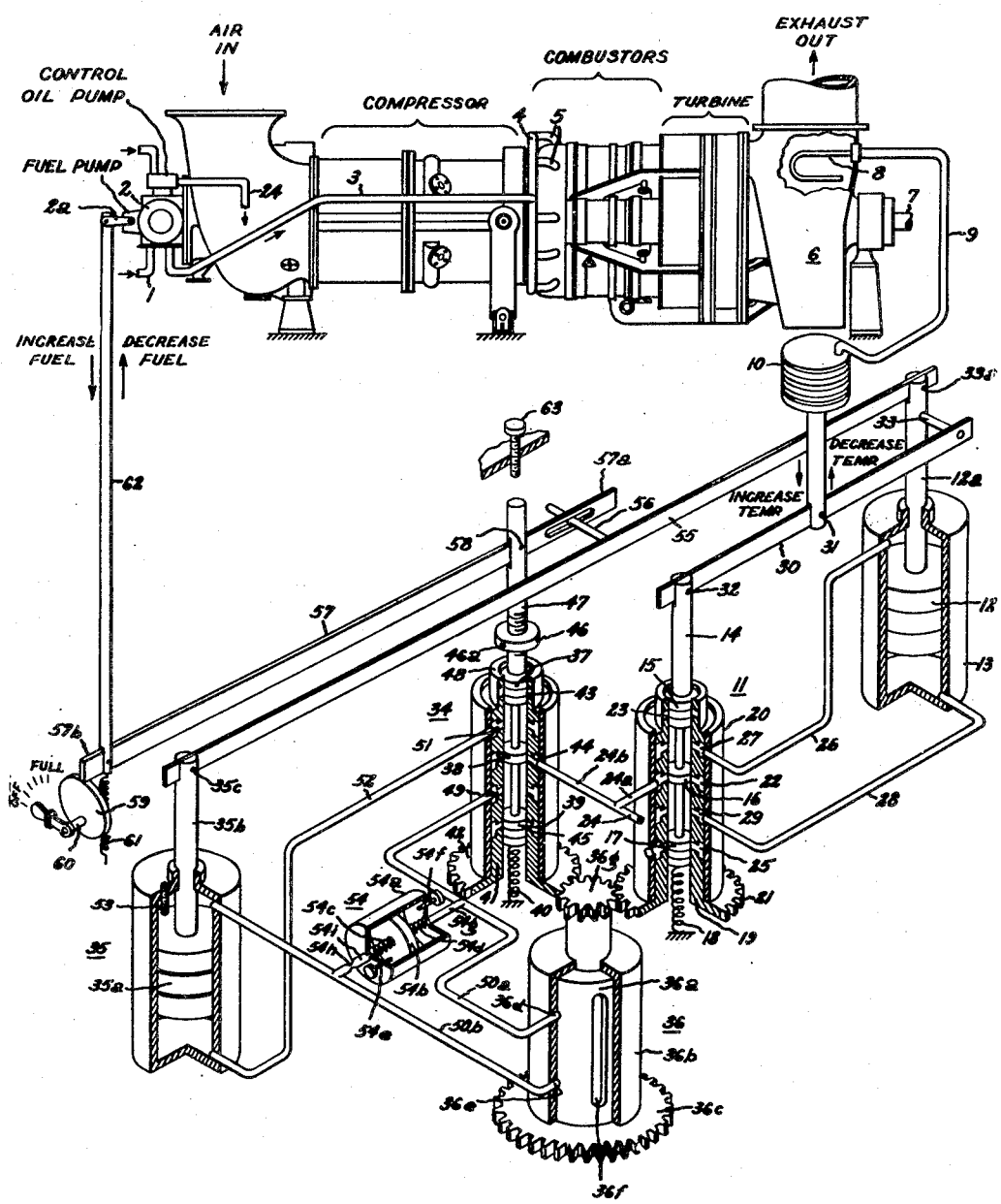
Inventor:
Neal E. Starkey,
by Crowell P. Mack
His Attorney.

Patented Oct. 31, 1950

2,528,252

UNITED STATES PATENT OFFICE 2,528,252

RATE OF CHANGE AND MAXIMUM LIMIT DEVICE FOR REGULATING SYSTEMS

Neal E. Starkey, Schenectady, N. Y., assignor to General Electric Company, a corporation of New York Application May 6, 1948, Serial No. 25,504

6 Claims. (Cl. 236—82)

This invention relates to a component for use in regulating systems, particularly systems having hydraulic mechanism for moving an output member in accordance with a signal generated by a condition responsive device.

An object of the invention is to provide a device of the type described capable of limiting the rate of change of the condition being controlled to a pre-determined value, regardless of the rate of change of the input signal. Another object is to provide an improved regulating device for limiting the maximum value of the condition to which the device is responsive. A further object is to provide a system which, by suitable design and adjustment, may be arranged to effect a substantially instantaneous response of the output member of a pre-determined magnitude, followed by a rate of change at a desired maximum rate, up to a pre-selected limiting position.

While the invention may be applicable generally as a component of many types of regulating systems in which a condition responsive device controls an output member, which in turn regulates the condition to which the device is responsive, it has been adapted particularly for use in connection with hydraulic-mechanical regulating systems for controlling the fuel pump of a gas turbine powerplant so as to limit the maximum value and rate of change of a temperature condition in the powerplant; and it is that application of the invention which has been particularly described herein. It should be understood however, that the invention may be applied to many other regulating systems where similar problems are encountered.

Other objects and advantages will become apparent from the following description, taken in connection with the accompanying drawing, in which is shown a gas turbine powerplant of the simple "open cycle" type having a fuel pump controlled automatically by a regulating system incorporating the invention. It will be readily understood by those familiar with gas turbine powerplants that this type ordinarily includes a multi-stage compressor supplying air at a pressure of several atmospheres to a combustion system in which a suitable fluid fuel is burned to produce hot gases which drive a turbine connected to the compressor, perhaps also driving a suitable load device. As shown, a variable displacement fuel pump is supported at the air inlet end of the powerplant and is arranged to be driven by the main rotor shaft through gears which are not shown. This pump may be of any suitable type having means for adjusting the displacement continuously in accordance with the position of a fuel pump control lever. A fluid fuel, for instance "bunker C" fuel oil, is supplied through an inlet conduit 1 to the pump 2 which discharges through conduit 3 to an annular manifold 4 connected by branch lines 5 to the several combustors which are spaced circumferentially around the axis of the powerplant. Each combustor is provided with a fuel spray nozzle (not shown) adapted to inject the fuel oil in the form of a fine spray so that it is readily mixed with air from the compressor to form a combustible mixture. The hot gases produced in the combustors pass through a suitable nozzle system (not shown) which directs the motive fluid into the buckets of the turbine wheel, which may be either of the single-stage or multi-stage type. Spent motive fluid is collected in a discharge scroll indicated generally at 6. The power output of the powerplant may be conveniently delivered by means of a shaft 7 coupled to the exhaust end of the turbine rotor.

In a powerplant of this type, operating at an extremely high temperature level, it is difficult to obtain temperature-responsive devices physically adequate to withstand for long periods of time the extreme temperatures to which they are subjected. Accordingly it has been found desirable to take the temperature of the spent motive fluid in the exhaust scroll 6 as an indication of the general temperature level at which the powerplant operates. To this end a suitable temperature-sensing device is supported in the exhaust hood, being shown in this case as a temperature-responsive "bulb" in the form of a long tube 8 arranged through and across the exhaust passage so as to be responsive to an average value of the gas temperatures existing in various portions of the exhaust hood. In a 5,000 H. P. powerplant, this temperature-responsive bulb may be ten feet or more in length; and it is charged with an expansible fluid, for instance argon gas. The pressure of the gas in the temperature-responsive bulb 8 is communicated through a conduit 9 to the regulating system described more particularly hereinafter, and this pressure is of course a measure of the average temperature existing in the exhaust hood 6.

As will be understood by those familiar with powerplants of this general type, the primary control of the temperature level at which the plant operates, and its power output, is effected by varying the supply of fuel to the combustion system. In the present case this is done by adjusting the pump control lever 2a so as to vary the displacement of the pump 2. It should be understood that other types of fuel supply systems may be used, and the pump control lever is intended to represent diagrammatically any control member which is positioned in accordance with the rate of fuel supply desired. Further details of the construction and arrangement of the powerplant itself and the fuel pump and its control mechanism are not material to an understanding of the present invention. It may be noted however that the specific powerplant for which the invention was intended, is disclosed completely in an application, Serial No. 754,002, filed June 11, 1947, in the names of Alan Howard, C. S. Rice, and B. O. Buckland, and assigned to the same assignee as the present application.

Referring now more particularly to the arrangement of the regulating system which comprises the present invention, the structure consists of two major sub-combinations. The first is a pressure responsive bellows 10 and a hydraulic relay for amplifying the output of the bellows, consisting of a primary pilot valve indicated generally at 11 and a piston 12 in a primary power cylinder 13. The primary pilot valve 11 includes a spindle 14 having spaced disks 15, 16, and 17 and biased upwardly by a coil spring 18. The disks are slidably disposed in the bore of a bushing 19 provided with a plurality of fluid ports. The bushing is rotatably disposed in a cylindrical casing 20 and has at its lower end a gear 21 arranged to cause the bushing to rotate continuously during operation. The effect of this relative rotation between bushing 19 and the pilot valve disks 15, 16, and 17 is to eliminate the hysteresis effects which would otherwise be introduced by sliding friction. The disk 15 is arranged to cooperate with an upper drain port 23. The middle disk 16 cooperates with a pressure fluid inlet port 22 communicating with oil supply conduits 24, 24a, which receive hydraulic operating liquid at a suitable pressure from a control oil pump supported on the powerplant and also arranged to be driven from the main rotor. The lowermost valve disk 17 is in cooperative relation with a lower drain port 25.

The primary power cylinder 13 is connected by means of conduit 26 with the pilot valve housing 20 so as to be in communication with ports 27 in the rotating bushing 19. The lower end of the power cylinder 13 is connected by conduit 28 so as to be in communication with ports 29 in the rotating bushing. As will be obvious from the drawing, a lever 30 is pivoted to the stem of the bellows 10 at 31, to the end of the pilot valve spindle at 32, and to the rod 12a of the power piston 12 by a dowel 33.

It will be readily apparent to those skilled in this art that the primary pilot 11, power cylinder 13, and the hydraulic and mechanical inter-connections therebetween, comprise a hydraulic amplifier for magnifying the displacement and force exerted by the temperature-responsive bellows 10. With the arrangement shown in the drawing, the displacement of the pivot 33 will be roughly twice that of the pivot 31. It will be appreciated that if a condition-responsive device is available having sufficient power and displacement, it can be attached directly at the pivot 33. In other words, the temperature-responsive device and the hydraulic amplifying sub-combination is simply a means for obtaining the necessary displacement at the point 33 with sufficient force to overcome any friction effects or other resistances in the system.

The other sub-combination includes a secondary pilot valve 34 arranged to supply pressure liquid to a secondary power cylinder 35, and a flow restricting device indicated generally at 36. The secondary pilot includes a spindle 47 having spaced valve disks 37, 38, and 39 biased upwardly by a spring 40. The disks are arranged to slide axially in the bore of a rotating bushing 41 driven by a gear 42. It will be apparent that the mechanical arrangement of this secondary pilot is very similar to that of the primary pilot 11. The upper valve disk 37 controls a drain port 43, disk 38 cooperates with the pressure liquid supply port 44, and the lower disk 39 controls the lower drain port 45. Also carried on the secondary pilot spindle 47 is an adjustable stop 46, which may be in the form of a circular collar carried on a thread on the spindle 47 and held in any desired adjusted position by means of a set screw or similar device 46a. This adjustable stop is adapted to engage the end surface 48 of the rotating bushing 41. The secondary pilot is in communication by way of ports 49, conduit 50a, the flow restricting device 36, and conduit 50b with the upper end of power cylinder 35. Ports 51 in the upper portion of the secondary pilot bushing 41 are in communication by way of a conduit 52 with the lower end of the power cylinder 35. Upward movement of pilot spindle 47 is limited by a normally fixed, but adjustable, stop 63.

The power cylinder 35 contains a piston 35a having a piston rod 35b, and is provided with a maximum position stop device. This may be in the form of an adjustable screw 53 arranged to limit the upward travel of piston 35a.

As represented in the drawings, the flow restricting device 36 comprises a rotating bushing 36a carried in a housing 36b and driven by a gear 36c. The conduit 50a communicates with a port 36d in housing 36b, while conduit 50b communicates with a port 36e. It will be apparent from the drawing that ports 36d and 36e are in communication with each other only when a groove 36f cut longitudinally of the rotating bushing 36a is in alignment with the ports. With the bushing 36a rotating, it will be apparent that the percentage of the time during which ports 36d, 36e are in communication will be determined by the relative dimensions of the ports, groove 36f, and the diameter of the bushing 36a. This type of flow restricting device is particularly advantageous in hydraulic regulating systems of the type described; but it will be appreciated by those skilled in the art that other equivalent devices may be used to provide a suitable degree of restriction to the flow of liquid between conduits 50a and 50b. In some cases a simple fixed or adjustable orifice may be used. For convenience, the rotating flow restricting device 36 will be referred to herein as a "chopper valve" because of its intermittent cut-off action on the flow of liquid.

As can also be seen in the drawing, a double-acting hydraulic accumulator, indicated generally at 54, is connected between conduits 50a and 50b in parallel with the chopper valve 36. This accumulator comprises a housing 54a having a bore in which is slidably arranged a floating piston 54b. In the cylinder at either side of the floating piston are suitable coil springs 54c and 54d. Projecting through either end of the cylinder 54a are adjustable stop screws 54e and 54f. The intermediate or neutral position of piston 54b is determined by the mechanical characteristics of the coil springs 54c and 54d, and the adjustable stops 54e and 54f determine the extreme limiting positions of the floating piston in either direction from its neutral position. Conduit 50a communicates with one end of cylinder 54a by an unrestricted conduit 54g. The other end of the accumulator cylinder communicates with conduit 50b by way of a conduit 54i containing a flow restricting device 54h, which may be a fixed orifice, a manually adjustable valve constituting a variable orifice, or a rotary flow restrictor like the chopper valve 36.

Hydraulic operating liquid at a suitable pressure, for instance 250 pounds per square inch, is supplied from the control oil pump through conduit 24 and the branch conduits 24a and 24b to the primary and secondary pilot valves respectively. As indicated in the drawing, the rotating bushings of the pilot valves may be driven by arranging the gears 21, 42, so as to engage with another gear 36g carried at the upper end of the rotating bushing 36a of the chopper valve. These rotating elements may be conveniently driven by having one of the gears in driving engagement with a pinion on the control oil pump shaft (not shown).

As will be apparent from the drawing, the end of secondary power piston rod 35b is pivoted at 35c to one end of a "balancing lever," which at its other end is pivoted at 33a to the rod 12a of primary power piston 12. An intermediate portion of the balancing lever 55 carries a connecting pin 56 engaging a slot in the end of an "output lever" 57. The output lever is pivoted at 58 to the upper end of the secondary pilot spindle 47. The extreme left-hand end 57b of the output lever bears against a rotatable cam 59 carried on a manually positioned shaft 60. While a cam and manually operated handle has been illustrated in the drawing for positioning the lever end 57b, it will be readily apparent that the lever portion 57b may be positioned by many other manual or automatic devices. The end 57b of the output lever is biased into engagement with cam 59 by means of a suitable tension spring 61; and the movement of the lever end portion is communicated by means of a push rod 62 to the displacement control lever 2a of the fuel pump.

The arrangement of the control device for the fuel pump is such that upward movement of rod 62 produces a decrease in the rate of fuel supply to the combustors, while downward movement of rod 62 increases the fuel supply. It will be apparent from the drawing that rotation of the manual control shaft 60 clock-wise causes the cam 59 to permit the end 57b of the output lever to descend under the biasing influence of spring 61 so as to increase the fuel supply. The general function of my improved temperature control system is to cause the end 57b of the output lever to move upwardly, out of engagement with cam 59, so as to decrease the fuel supply below that called for by the manual control cam 59, in accordance with excessive temperature or rates of change of temperature conditions in the power plant. The details of the various modes of operation are as follows.

In general, the secondary power cylinder 35 and its related hydraulic and mechanical elements serves to set up a "datum rate of movement" which is mechanically "compared" by the balancing lever 55 with the rate of movement produced by the condition responsive power piston 12, the piston 35a also having a limiting position which determines the maximum value which the controlled condition may attain. The basic ways in which the system may operate are as follows:

1. When the rate of change of temperature is less than a pre-selected maximum rate, the condition-responsive rate of movement of piston 12 is less than the datum rate of movement of piston 35a.

2. When the rate of change of temperature is just equal to the maximum permissible rate, the rate of movement of the condition-responsive piston 12 is equal to the datum rate of piston 35a.

3. When the temperature change exceeds the maximum desired rate, the rate of change of piston 12 is greater than that of piston 35a.

4. When the temperature is at, or exceeds the maximum limiting value, the datum piston 35a is against maximum stop 53 and the adjustable stop 46 bears against the surface 48 of bushing 41.

Referring to method No. 1, when the rate of change of temperature is less than the pre-selected maximum rate, the operation is as follows. Assume that bellows 10 extends gradually as a result of slowly increasing temperature in the exhaust hood 6. The pivot 31 descends so as to lower the pilot valve spindle 14, admitting oil from the supply port 22 through conduit 26 to the top of piston 12, causing it to descend. The lever 30 then pivots about point 31 so that the pilot valve spindle 2 is raised and the supply of liquid to conduit 26 is stopped. The result of this action is that the power piston 12 descends in accordance with the movement of bellows 10, but with a displacement magnified in proportion to the distances between pivots 33, 32, and 31, 32. In effect, the lever 30 moves about pivot 32 as a fixed point (although pivot 32 is transiently displaced) so that the movement of the pivot 33 is magnified, while the oil pressure furnishes all the force required to move the pivot 33 against any friction and biasing forces present in the system. Pivot 33 now descends at a rate less than the pre-determined maximum rate of change.

Upon downward movement of piston rod 12a, the balancing lever 55 pivots about the other end point 35c so that the connecting pin 56 causes the output lever 57 to pivot clock-wise about the end 57b. This movement of output lever 57 clock-wise results in lowering the pilot valve spindle 47 so that oil enters through supply conduit 24b and passes through conduit 52 to the lower side of power piston 35a, causing the latter to rise. During this movement, oil is exhausted from the upper part of cylinder 35a through conduit 50b by way of the chopper valve 36, conduit 50a, and the upper drain port 43 in bushing 41. The function of the flow restrictor 36 is to limit to a pre-determined value the rate of movement upwardly of the piston 35a. The value of the rate of movement permitted is a function of the geometry of the chopper valve, as noted above. Since it was assumed that the rate of movement of piston 12 was less than that of the datum piston 35a, piston 35a will tend to move upwardly faster than piston 12. However when this happens the connecting pin 56 will rise, so that pilot valve spindle 47 rises to reduce or shut off completely the flow of oil from conduit 24b to conduit 52. This causes the rate of movement of datum piston 35a to slow down until it becomes exactly equal to the rate of movement of piston 12. The net result is that the connecting pin 56 stays fixed in space. In other words, the system permits a slow increase in temperature, as long as the temperature is below the maximum limiting value, without producing any net effect on the output lever 57. Under such conditions, the output lever 57 may be positioned by the manual control means 60 to select any power output desired, without interference from the automatic regulating system.

With respect to method of operation No. 2, when the rate of change of temperature is just equal to the permissible rate of change as determined by datum piston 35a, the operation is the same as described above, except that there is no tendency for the pilot valve spindle 47 to shut off the flow of oil from conduit 24b to conduit 52. On the other hand, the spindle remains in such a position that the port 44 is continuously wide open, with the adjustable stop 46 almost, but not quite, touching the end surface 48 of bushing 41. The design of the components is such that the supply of oil to cylinder 35 causes piston 35a to move at such a rate relative to piston 12 that connecting pin 56 remains stationary.

With respect to method of operation No. 3, where the rate of change of temperature is too fast, as compared with the permissible datum rate of change established by piston 35a, the operation is as follows. The temperature-responsive bellows 10 and its associated hydraulic relay causes the point 33a to descend too rapidly. The balancing lever 55 then pivots clock-wise about the point 35c so that the pilot spindle 47 is caused to descend and the adjustable stop 46 engages the end surface 48 of bushing 41. As described above, the descent of spindle 47 effects supply of oil through conduits 50a, 50b so that piston 35a rises at a pre-selected rate as determined by the flow restricter 36. Since the point 33a is now descending more rapidly than the point 35c is rising, the connecting pin 56 descends so that the output lever is caused to rotate clock-wise about the pivotal connection 58, which acts as a fixed fulcrum since the stop 46 is against surface 48. The effect of this clock-wise rotation of lever 57 is to raise rod 62 to decrease the stroke of the fuel pump, thereby reducing the supply of fuel to the combustors so as to decrease the rate of increase of temperature in the exhaust hood 6.

Upon decreasing temperature, where the rate of decrease is less than or equal to the pre-selected rate established by piston 35a, the method of operation is as described above, but in reverse. However, when the rate of decrease is greater than that established by the piston 35a, the operation is as follows. The pivot 31 moves up rapidly, so that point 33a rises and the balancing lever 55 pivots counter-clockwise about point 35c, with the result that the connecting pin 56 moves pilot spindle 47 upwardly, until it strikes the adjustable stop 63. This uncovers port 44 so that oil flows through port 49, conduit 50a, the chopper valve 36, and conduit 50b, to the top of piston 35a, so that the latter moves downwardly. The net result is that point 33a of the balancing lever moves upwardly faster than the pivot 35c moves downwardly, so that the connecting pin 56 causes the output lever 57 to pivot counter-clockwise about the pivot 58, the comparatively powerful hydraulic servo-mechanism overcoming the manual control and lowering rod 62 to somewhat increase the stroke of the fuel pump. The increased fuel supply then causes the exhaust hood temperature to decrease at a slower rate.

With respect to method of operation No. 4, the operation of the system as a maximum temperature limit is as follows. Assume that the temperature increases gradually, at a rate below the pre-selected maximum. The piston 35a will rise until eventually it engages the maximum temperature adjusting stop 53. Since the rate of increasing temperature was below the maximum permissible rate, the adjustable stop 46 will not engage the surface 48. If now the temperature rises still further the point 33a will descend, so the balancing lever pivots about the point 35c (which is now fixed since the piston 35a is against the stop 53) and the connecting pin 56 will be caused to descend, valve stem 47 descends, and the adjustable stop 46 engages bushing surface 48. Now the pivot 58 is in effect fixed, and further increase in temperature will cause the balancing lever 55 to rotate clockwise about the pivot 35c. The output lever also rotates clockwise about pivot 58, causing the pump stroke to decrease, so that the reduced fuel supply is just sufficient to maintain the pre-determined maximum temperature.

If the rate of change of the piston 12 is greater than the datum rate established by the piston 35a, then the adjustable stop 46 will engage bushing 41 before piston 35a engages the limit stop 53. Under such conditions, the output lever 57 will begin to rotate about pivot 58 to decrease the fuel pump stroke and reduce the rate of change of temperature to the pre-selected rate, which will be maintained as described above until piston 35a engages stop 53, after which lever 57 will be caused to rotate clock-wise about pivot 58 to reduce the pump stroke still further and prevent the temperature from rising above the pre-selected absolute maximum.

The purpose of the hydraulic accumulator 54 is to permit a certain initial instantaneous change in the condition controlled. This initial change may take place at any rate, uninfluenced by the rate of change control feature described above. This effect is produced as follows. Assume that the temperature in the exhaust hood 6 jumps very suddenly so that the secondary pilot spindle 47 descends and causes pressure oil to flow rapidly from the supply conduit 24b to conduit 52 and the bottom of piston 35a. The result is a suddenly applied upward force on piston 35a, causing a sudden surge of pressure in the exhaust conduit 50b. As described above, the flow restricting device 36 tends to limit the rate at which the fluid can escape from cylinder 35 through the conduit 50b; however the surge of pressure produced in conduit 50b causes the floating piston 54b in the double-acting hydraulic accumulator to be displaced to the right against the bias of spring 54d. This displacement of the piston 54b permits a sudden movement of the piston 35a, the size of this initial jump being determined by the displacement of the piston 54b, as limited by the adjustable stop screw 54f. After the piston 54b engages the stop, further flow of liquid through conduit 50b must be by way of the chopper valve 36, therefore the rate of change of piston 35a is limited as described above. When a steady state condition has been achieved, the springs 54b and 54c cause the piston 54b to again be centered in the cylinder 54a. Similarly, when liquid is suddenly supplied from the secondary pilot through conduit 50a, the sudden surge of pressure produced in conduit 50a causes the piston 54b to be displaced to the left, so that a certain volume of liquid is suddenly forced into conduit 50b and to the upper surface of piston 35a, thus producing a sudden movement of the piston downwardly. The degree of this sudden movement is similarly limited by the adjustable stop 54e in cylinder 54a. The rate of change at which these sudden initial movements are effected may be limited by a flow restriction as indicated diagrammatically at 54h in the drawing. This flow restriction may be a fixed orifice, an adjustable valve constituting a manually variable orifice, or even a rotary flow restricter like the device 36.

In an actual regulator, there is always a certain amount of dissolved gas in the operating liquid used, so that the hydraulic fluid is not truly incompressible. Furthermore, there may be a slight degree of lost motion in the various pivoted joints. Also, a sudden surge of pressure may cause the conduits to expand slightly in volume, and certain leakage paths cannot be completely sealed. All these factors are additive, and the result is that there will be in the system an inherent tendency to permit a sudden initial jump before the rate of change limiting devices begin to take effect. These factors must be taken account of, in accordance with actual experience with the operating device, in determining what adjustment of the hydraulic accumulator 54 will result in an initial jump of the size desired. In some instances, this inherent tendency of the system to permit a sudden initial jump can be taken advantage of to completely eliminate the need for the hydraulic accumulator 54. Note also that the adjustable spacing of the stop 46 from surface 48, and stop 63 from the end of spindle 47 has an effect on the magnitude of the initial "jump" permitted. By careful design, the above-mentioned factors may be so controlled that the compressibility of the liquid, the expansibility of the conduits and the other factors mentioned will permit a sudden initial jump in temperature without any accumulator connected in parallel with the flow restricter 36. However, the accumulator 54, arranged as shown in the drawing, is advantageous in that it permits ready means for adjusting the size of the initial jump. Furthermore with the accumulator 54 arranged as shown in the drawing, the initial jump in one direction may readily be made different in magnitude from that permitted in the opposite direction.

The above-described modes of operation are ordinarily combined so that the system will permit a substantially instantaneous pre-determined increase in temperature, followed by a gradual change at a maximum pre-determined rate, after which the temperature is limited to a pre-selected absolute value. This operation is as follows.

Assume that the manual control shaft 60 is suddenly rotated clock-wise so as to cause the left-hand end 57b of the output lever to move rapidly downward under the bias of spring 61. The output lever pivots about connecting pin 56 so that the pilot spindle 47 is lowered and the adjustable stop 46 engages bushing 41. One function of the adjustable stop 46 is to thus limit to a pre-determined valve the instantaneous increase in fuel supply which the manual control can call for, since further rotation of shaft 60 will merely more cam 59 out of engagement with lever end 57b. With the stop 46 against bushing 41, and the pump 2 producing an increased flow of fuel to the combustors, the resulting increase in temperature will cause the bellows 10 to lower the point 33a so that the balancing lever 55 pulls connecting pin 56 downwardly, with the result that the output lever 57 immediately rotates about the pivot 58 (which is fixed since stop 46 is against bushing 41) and the pump stroke is decreased somewhat, the left-hand end 57b of the output lever moving up and away from the control cam 59. Actually however, as soon as the spindle 47 was lowered, the piston 35a began to rise at its pre-set rate so as to permit only a certain rate of increase in temperature, as described above. Furthermore, the initial action of the regulating system will be modified by the effect of the accumulator 54, as described above.

It will be seen that the actual operation of the device is extremely complex; however, by suitable design and adjustment of the various components, the system disclosed can be effectively arranged to permit a sudden initial jump in temperature, for instance of the order of 200° F., followed by a gradual increase in temperature at a maximum rate of for instance 20° F. per second, up to a maximum limiting value of perhaps 850° F. The sizes of these quantities are of course dependent on the characteristics of the particular thermal powerplant with which the system is used.

In actual operation the invention has been found to have exceedingly important advantages as applied to a gas turbine powerplant of the type described. For instance, with the arrangement shown, any accidental leakage of oil in the various hydraulic components is not critical, since leakage merely results in a readjustment of the hydraulic pilot valves so that sufficient oil is continuously supplied to make up the leakage. By reason of the rotating bushings provided for the various flow control valves, the effects of friction are eliminated. Furthermore, there is abundant power available from the hydraulic liquid to position the various components regardless of any friction effect or extraneous biasing forces.

A further important advantage of the system is that the "time constant" of the temperature sensing device is not a critical factor. It will be appreciated by those skilled in the art that, in any practical condition-responsive device, there is a certain time lag between the initiation of a condition change and the response of the device. In many cases, this time constant seriously interferes with or limits the applicability of the regulating system. With the present system, however, it is possible by proper design and adjustment to so match the operating characteristics of the rate of change control motor 35 to the response characteristic of the temperature sensitive device that a close approximation of the combined response of the condition-responsive device and the rate of change controlling device is obtained, as compared with the response characteristics sought to be obtained.

It is desired to particularly point out that the present illustration of the application of the invention to a gas turbine regulating system has been simplified in many particulars in order to make the above explanation, which is complex at best, as simple and understandable as possible. However, the invention is readily adaptable to combination with other regulating devices. Thus the cam 59 in the drawing, which is represented as being a simple manually adjustable member, may be replaced by many complex devices for positioning the end 57b of the output lever in accordance with a desired schedule of fuel flow to the combustors. Such a complete control system is disclosed in an application, Serial No. 84,416, filed March 30, 1949, in the names of N. E. Starkey, C. B. Lewis, and M. A. Edwards.

While a particular embodiment of the invention has been described, it will be readily apparent to those skilled in the art that many variations and substitutions of equivalents might be made; and I desire to cover by the appended claims all such changes and modifications as fall within the true spirit and scope of the invention.

What I claim as new and desire to secure by Letters Patent of the United States is:

1. In a regulating system for a machine having a control member and a device responsive to a condition appurtenant to the operation of the machine with an input member positioned in accordance with changes in said condition, the combination of an output lever member having one end portion connected to position the control member, a balancing lever member, first hydraulic motor means for effecting displacement of a first portion of the balancing lever in accordance with changes in position of the input member, second hydraulic motor means for concurrently effecting displacement of a spaced portion of the lever in the opposite direction according to a pre-selected schedule of rates of displacements, and means connecting an intermediate portion of the balancing lever to the other end of the output lever member whereby the latter is caused to be displaced as a function of the difference in displacement of said spaced balancing lever portions, said second motor means comprising a hydraulic motor adapted to position said second spaced portion of the balancing lever, a hydraulic pilot valve having a longitudinally slidable spindle connected to an intermediate portion of the output lever member, first and second conduit means connecting the pilot valve with the second motor, a flow-restricting device in one of said conduits, first adjustable stop means for limiting the movement of the second hydraulic motor in the direction of increasing input signal, other adjustable stop means for establishing preselected limiting positions for the pilot valve spindle in either direction, and double-acting hydraulic accumulator means connected in parallel with said flow restriction whereby, upon a sudden large change in position of said input member, the output member is caused to be displaced substantially instantaneously by a pre-selected amount, after which further displacement takes place at a preselected maximum rate.

2. In a condition-responsive system, the combination of an input member positioned in accordance with changes in a condition, an output lever member having a first end portion adapted to be positioned to produce the output movement and a second end portion pivotally connected to an intermediate portion of a balancing lever member, means for effecting displacement of a first end portion of the balancing lever in accordance with changes in position of the input member, and separate servo-motor means for concurrently effecting displacement in the opposite direction of the other end portion of the balancing lever, said servo-motor means comprising a double-acting motor connected to said second end portion of the balancing lever and having pilot means connected to an intermediate portion of the output lever, whereby movement of the first end portion of the balancing lever in accordance with the input signal effects movement of the output lever about its said first end portion to position the pilot means and cause the motor to move the second end portion of the balancing lever in the direction opposite to the input signal movement, means for limiting the rate of response of said motor to a preselected datum rate of movement, and stop means for limiting the movement of the pilot means in at least one direction, whereby after the degree of movement permitted by said stop means the pilot means serves as a fixed fulcrum so that further movement of the balancing lever effects an output movement of said first end portion of the output lever when the rate of change of the input signal is greater than the rate corresponding to said datum rate of movement of the servo-motor.

3. Regulating mechanism in accordance with claim 2 and having stop means for limiting movement of the pilot means in each direction whereby an output signal movement is effected upon excessive rates of change of the input signal for both increasing and decreasing values thereof.

4. Regulating mechanism in accordance with claim 2 and having other stop means for determining the extreme position of the servo-motor in the direction corresponding to increasing values of the input signal, whereby, upon attainment of the maximum permissible value of the condition controlled, said other stop means causes the connection between servo-motor and balancing lever to act as a fulcrum so any further movement of the balancing lever in the increase condition direction results directly in output signal movement of the output lever.

5. In a hydraulic regulating system for a machine having a control member for altering an operating condition thereof, means for positioning the control member including the combination of a device responsive to said operating condition and having a signal input member positioned in accordance with changes in said condition, a balancing lever member, means for positioning one end of said lever in accordance with the input signal, double-acting hydraulic motor means for concurrently positioning the other end of the balancing lever according to a preselected schedule of rates of change of movement, an output lever member connected at one end to the machine control member, manual means for resiliently positioning said one end of the output lever in the direction to cause the control member to increase the values of said operating condition, said output lever end being always free to move in the opposite decrease-condition direction irrespective of said manual positioning means, means pivotally connecting the other end of the output lever to an intermediate portion of the balancing lever, whereby said pivotal connection positions the output lever as a function of difference in displacement of the balancing lever end portions, said hydraulic motor means including a cylinder having a reciprocable double-acting piston connected to one end of the balancing lever, a hydraulic pilot valve having a longitudinally slidable spindle pivoted to an intermediate portion of the output lever, first conduit means for supplying operating liquid from the pilot valve to move the positioning motor piston in the direction tending to decrease the operating condition when the input signal changes in the increase condition direction, second conduit means connecting the hydraulic motor with the pilot valve for supplying operating liquid to move the positioning piston in the increase condition direction when the input signal changes in the decrease condition direction, one of said conduits including means restricting flow therethrough to a preselected maximum value whereby the rate of movement of the positioning piston in either direction is limited to a preselected maximum value, a change in the input signal at a rate less than the maximum allowable value serving to position the pilot valve and cause the positioning piston to move in the opposite direction at a rate just sufficient to keep the pivotal connection between balancing lever and output lever stationary so that no movement is imparted to the control member and the manual positioning means remains free to control the machine without interference from the automatic regulating mechanism, first adjustable stop means associated with said pilot valve spindle and adapted to limit the movement thereof in the direction corresponding to an increase in the operating condition whereby upon a change in the input signal at a rate of change greater than the maximum allowable rate said first stop reaches its limiting position whereupon the pivotal connection between pilot valve spindle and output lever acts as a fixed fulcrum and further movement of the balancing lever in the increase condition direction effects rotation of the output lever about said fulcrum to move the control member in the decrease condition direction, second stop means associated with said pilot valve spindle and adapted to limit the movement thereof upon a change of the input signal in the decrease condition direction at a rate greater than the allowable maximum value whereby upon occurrence of such change the pilot valve spindle engages the second stop and the output lever is thereafter caused to move in the increase condition direction in order to limit the rate of decrease of the condition to the preselected maximum value, and third stop means adapted to limit the movement of the balancing lever in the increase condition direction whereby upon increase of the operating condition to the maximum permissible value the balancing lever pivots in the decrease condition direction to cause said first stop to reach its limiting position after which the control member is caused to move in the decrease condition direction.

6. Hydraulic condition regulating mechanism in accordance with claim 5 including hydraulic accumulator means connected in the conduit means in parallel relation with the flow restriction, said accumulator including a surge chamber containing a member adapted to be displaced by sudden surges of pressure at either side of the flow restriction, resilient means biasing said movable member to a neutral equilibrium position, and separately adjusted stop means for independently limiting the movement of said movable member in either direction from the neutral position, whereby an initial increment of movement of the positioning piston is permitted in either direction at a rate of change greater than the normal maximum allowable rate, said independently adjustable stop means effecting different degrees of such initial movement in the respective directions.

NEAL E. STARKEY.

REFERENCES CITED

The following references are of record in the file of this patent:

UNITED STATES PATENTS

| Number | Name | Date |
| --- | --- | --- |
| 1,959,889 | Wunsch | May 22, 1934 |
| 2,117,800 | Harrison | May 17, 1938 |
| 2,234,326 | Tiebel | Mar. 11, 1941 |
| 2,266,871 | Krogh | Dec. 23, 1941 |
| 2,397,213 | Smith | Mar. 26, 1946 |
| 2,435,902 | Reggio | Feb. 10, 1948 |

FOREIGN PATENTS

| Number | Country | Date |
| --- | --- | --- |
| 466,738 | Germany | Oct. 12, 1928 |
| 521,603 | Great Britain | May 27, 1940 |